(12) United States Patent
Zeng

(10) Patent No.: US 10,302,850 B2
(45) Date of Patent: May 28, 2019

(54) BACKLIGHT MODULE AND LIQUID CRYSTAL DISPLAY

(71) Applicant: Wuhan China Star Optoelectronics Technology Co., Ltd., Wuhan, Hubei (CN)

(72) Inventor: Jie Zeng, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 102 days.

(21) Appl. No.: 14/779,392

(22) PCT Filed: Jul. 17, 2015

(86) PCT No.: PCT/CN2015/084278
§ 371 (c)(1),
(2) Date: Sep. 23, 2015

(87) PCT Pub. No.: WO2016/206147
PCT Pub. Date: Dec. 29, 2016

(65) Prior Publication Data
US 2017/0219765 A1    Aug. 3, 2017

(30) Foreign Application Priority Data

Jun. 26, 2015 (CN) .......................... 2015 1 0364198

(51) Int. Cl.
*F21V 8/00* (2006.01)
*G02F 1/1335* (2006.01)
(52) U.S. Cl.
CPC ......... *G02B 6/0088* (2013.01); *G02B 6/0051* (2013.01); *G02B 6/0053* (2013.01); *G02B 6/0055* (2013.01)

(58) Field of Classification Search
CPC .. G02B 6/0088; G02B 6/0053; G02B 6/0051; G02B 6/005
See application file for complete search history.

(56) References Cited

U.S. PATENT DOCUMENTS

2005/0157517 A1* 7/2005 Nomura ............ G02F 1/133615
                                                    362/603
2006/0268437 A1* 11/2006 Sun ...................... G02B 5/0215
                                                    359/834

(Continued)

FOREIGN PATENT DOCUMENTS

CN         101963314 A        2/2011
CN         104373871 A        2/2015
(Continued)

*Primary Examiner* — Anh T Mai
*Assistant Examiner* — Zachary J Snyder
(74) *Attorney, Agent, or Firm* — Andrew C. Cheng

(57) ABSTRACT

The present invention provides a backlight module, comprising an optical film assembly, a light guide plate, a reflective sheet, and the optical film assembly comprises a first prismatic glass, and the first prismatic glass comprises a display region, two side walls, a junction region, and the display region and the reflective sheet are oppositely located, and the side wall is formed by the display region extending downward, and the side wall is connected between the display region and the junction region to form an accommodation space, and the light guide plate and the reflective sheet stack up together inside the accommodation space, and the light guide plate is located between the reflective sheet and the optical film assembly, and the reflective sheet is located between the light guide plate and the junction region.

8 Claims, 2 Drawing Sheets

(56) References Cited

U.S. PATENT DOCUMENTS

| | | | | |
|---|---|---|---|---|
| 2008/0205066 A1* | 8/2008 | Ohta | ................... | G02B 5/045 |
| | | | | 362/311.06 |
| 2009/0303413 A1* | 12/2009 | Ohta | ................... | G02B 5/045 |
| | | | | 349/62 |
| 2010/0039584 A1* | 2/2010 | Sasaki | ................... | G02B 5/02 |
| | | | | 349/62 |
| 2010/0067117 A1* | 3/2010 | Ohta | ................... | G02B 5/045 |
| | | | | 359/622 |
| 2010/0097782 A1* | 4/2010 | Lee | ................... | G02B 6/005 |
| | | | | 362/97.1 |
| 2011/0026240 A1* | 2/2011 | Hayashi | ............... | G02B 6/0065 |
| | | | | 362/97.1 |
| 2012/0113369 A1* | 5/2012 | Kim | ................... | G09F 3/10 |
| | | | | 349/122 |
| 2012/0133859 A1* | 5/2012 | Cha | ................... | G02F 1/133528 |
| | | | | 349/61 |
| 2012/0169963 A1* | 7/2012 | Park | ................... | G02F 1/133308 |
| | | | | 349/62 |
| 2012/0212928 A1* | 8/2012 | Lee | ................... | G02F 1/1333 |
| | | | | 362/19 |
| 2014/0267980 A1* | 9/2014 | Kang | ................... | G02F 1/1336 |
| | | | | 349/62 |
| 2015/0260907 A1* | 9/2015 | Yang | ................... | G02B 6/0088 |
| | | | | 362/606 |

FOREIGN PATENT DOCUMENTS

| | | |
|---|---|---|
| CN | 204268241 U | 4/2015 |
| JP | H10106329 A | 4/1998 |
| JP | 1999353922 A | 12/1999 |
| JP | 2010197845 A | 9/2010 |
| JP | 2014182369 A | 9/2014 |
| JP | 2014203602 A | 10/2014 |
| WO | 2014129821 A1 | 8/2014 |

* cited by examiner

BACKLIGHT MODULE AND LIQUID CRYSTAL DISPLAY

CROSS REFERENCE

This application claims the priority of Chinese Patent Application No. 201510364198.6, entitled "Backlight module and liquid crystal display device", filed on Jun. 26, 2015, the disclosure of which is incorporated herein by reference in its entirety.

FIELD OF THE INVENTION

The present invention relates to a liquid crystal display technology field, and more particularly to a backlight module and a liquid crystal display having the backlight module.

BACKGROUND OF THE INVENTION

With the constant development of the backlight display technology, the liquid crystal display devices, such as the Liquid Crystal Display (LCD) as being a display component has been widely utilized in the electronic products, such as the mobile phones, the digital camera, the Personal Digital Assistant (PDA). Along with that the frame of the electronic product becomes narrower and narrower, and the liquid crystal industry constantly progresses, the large scale LCD image display and the frame thinness have gradually become mainstream requirement of the market.

The backlight module is an important component in the liquid crystal display, and the frame design also became a tendency. The narrow frame means that the watched image area is larger and the visual effect is good in the screen of the same size. The present backlight module generally comprises: a light guide plate, a glue frame located around the light guide plate, a flexible printed circuit board, an optical film and a shading tape. The flexible printed circuit board is fixed on the light guide plate and the glue frame with the shading tape. The optical film is fixed on the glue frame with the shading tape.

Such kind of backlight module has problems as below:

The glue frame itself must have a certain thickness, which consequently increases the thickness of the backlight module, and thus, increases the entire thickness of the liquid crystal display. The mainstream of the market cannot be satisfied. Moreover, the components needed for the present backlight module are more, and the structure is complicated to increase the manufacture cost; besides, the assembly process of the glue frame and the light guide plate is more complicated, and the assembly efficiency is lower.

SUMMARY OF THE INVENTION

An objective of the present invention is to provide a backlight module, having advantages which the thickness of the backlight module is small and the assembly process is simple.

Another objective of the present invention is to provide a liquid crystal display utilizing the aforesaid backlight module.

For realizing the aforesaid objective, the technical solution provided by the embodiments of the present invention is:

The present invention provides a backlight module, comprising an optical film assembly, a light guide plate, a reflective sheet, and the optical film assembly comprises a first prismatic glass, and the first prismatic glass comprises a display region, two side walls, a junction region, and the display region and the reflective sheet are oppositely located, and the side wall is formed by the display region extending downward, and the side wall is connected between the display region and the junction region to form an accommodation space, and the light guide plate and the reflective sheet stack up together inside the accommodation space, and the light guide plate is located between the reflective sheet and the optical film assembly, and the reflective sheet is located between the light guide plate and the junction region.

Fold lines are formed at a juncture of the display region and the side wall and at a juncture of the junction region and the side wall for easily bending the first prismatic glass.

An inner side of the side wall of the first prismatic glass is coated with a reflective layer, and the reflective layer reflects light entering a surface thereof back into the light guide plate.

The junction region and one of the side walls are an integrated structure and extends to the other side wall, and the junction region is adhered at a bottom of the reflective sheet.

An amount of the junction regions is two, and one of the junction regions is connected to one of the side walls, and the other of the junction regions is connected to another side wall, and the two junction regions respectively extend from the two side walls to each other, and the two junction regions are adhered at a bottom of the reflective sheet.

Free ends of the two junction regions are connected together and contact with each other.

Free ends of the two junction regions are separated from each other and respectively adhered at the bottom of the reflective sheet.

The optical film assembly further comprises a second prismatic glass and a diffuser, and the second prismatic glass is located between the first prismatic glass and the diffuser, and the diffuser is laminated on the light guide plate.

One circumferential outer surface of the light guide plate is provided with an incident surface, and the rest circumferential outer surfaces of the light guide plate are coated with a reflective layer, and the reflective layer reflects light entering a surface thereof back into the light guide plate.

The present invention further provides a liquid crystal display, comprising a backlight module, and the backlight module comprises an optical film assembly, a light guide plate, a reflective sheet, and the optical film assembly comprises a first prismatic glass, and the first prismatic glass comprises a display region, two side walls, a junction region, and the display region and the reflective sheet are oppositely located, and the side wall is formed by the display region extending downward, and the side wall is connected between the display region and the junction region to form an accommodation space, and the light guide plate and the reflective sheet stack up together inside the accommodation space, and the light guide plate is located between the reflective sheet and the optical film assembly, and the reflective sheet is located between the light guide plate and the junction region.

Fold lines are formed at a juncture of the display region and the side wall and at a juncture of the junction region and the side wall for easily bending the first prismatic glass.

An inner side of the side wall of the first prismatic glass is coated with a reflective layer, and the reflective layer reflects light entering a surface thereof back into the light guide plate.

The junction region and one of the side walls are an integrated structure and extends to the other side wall, and the junction region is adhered at a bottom of the reflective sheet.

An amount of the junction regions is two, and one of the junction regions is connected to one of the side walls, and the other of the junction regions is connected to another side wall, and the two junction regions respectively extend from the two side walls to each other, and the two junction regions are adhered at a bottom of the reflective sheet.

Free ends of the two junction regions are connected together and contact with each other.

Free ends of the two junction regions are separated from each other and respectively adhered at the bottom of the reflective sheet.

The optical film assembly further comprises a second prismatic glass and a diffuser, and the second prismatic glass is located between the first prismatic glass and the diffuser, and the diffuser is laminated on the light guide plate.

One circumferential outer surface of the light guide plate is provided with an incident surface, and the rest circumferential outer surfaces of the light guide plate are coated with a reflective layer, and the reflective layer reflects light entering a surface thereof back into the light guide plate.

The embodiments of the present invention have advantages or benefits:

In the backlight module of the present invention, with extending the first prismatic glass into multiple regions, the first prismatic glass can be bent to fix the light guide plate and the reflective sheet to eliminate the technical solution of the glue frame. The technical issue that the entire thickness of the backlight module is too thick is solved to achieve the skill result of diminishing the entire thickness of the backlight module and realizing the narrow frame design. Besides, the structure of the backlight module according to the present invention is simple. The manufacture cost is not only decreased but the assembly process of the entire backlight module also can be more convenient, which tremendously promote the assembly efficiency.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
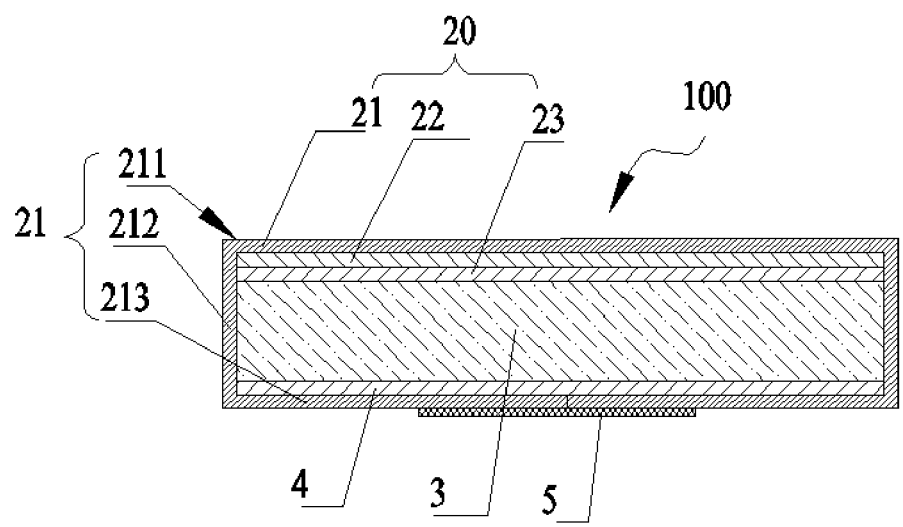
FIG. 1 is a structural diagram of a backlight module according to the first preferred embodiment of the present invention.

Please refer to FIG. 1. The backlight module 100 according to the embodiment of the present invention can be a liquid crystal backlight module, comprising an optical film assembly 20, a light guide plate 3, a reflective sheet 4, and the optical film assembly 20 comprises a first prismatic glass 21, and the function of the first prismatic glass is to concentrate the light to raise the face brightness, and the first prismatic glass 21 comprises a display region 211, two side walls 212 formed by the display region 211 extending downward, a junction region 213, and the display region 211 and the reflective sheet 4 are oppositely located, and the side wall 212 is connected between the display region 211 and the junction region 213 to form an accommodation space, and the optical film assembly 20 is located on the light guide plate 3 to process the light emitted from the light guide plate 3 for making the intensity of the light emitted from the backlight module 100 larger and more uniform, and the light guide plate 3 and the reflective sheet 4 stack up together inside the accommodation space, and the light guide plate 3 is located between the reflective sheet 4 and the optical film assembly 20, and the reflective sheet 4 is located between the light guide plate 3 and the junction region 213. Preferably, the light guide plate 3 and the reflective sheet 4 are mutually aligned.

With extending the first prismatic glass 21 into the display region 211, the side wall 212 and the junction region 213, and bending the first prismatic glass 21 to fix the light guide plate 3 and the reflective sheet 4, the glue frame can be eliminated. Thereby, the assembly gap existing in the assembly process of the backlight module 100 can be erased. Moreover, the entire thickness of the backlight module 100 is diminished to achieve the narrow frame design. Besides, the structure of the backlight module 100 according to the present invention is simple. The manufacture cost is not only decreased but the assembly process of the entire backlight module 100 also can be more convenient, which tremendously promote the assembly efficiency.

Figure 2:
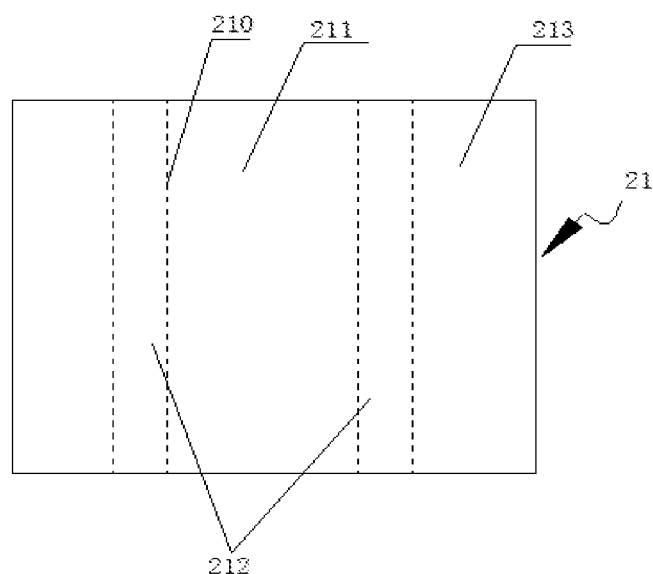
FIG. 2 is a partial diagram of the backlight module according to the second embodiment of the present invention.

Furthermore, referring to FIG. 2, the first prismatic glass 21 comprises fold lines 210, and the fold lines 210 are formed at a juncture of the display region 211 and the side wall 212 and at a juncture of the junction region 213 and the side wall 212 for more easily bending the first prismatic glass 21.

Furthermore, referring to FIG. 1, the optical film assembly 20 further comprises a second prismatic glass 22 and a diffuser 23. The first prismatic glass 21, the second prismatic glass 22 and the diffuser 23 are stack up from top to bottom in sequence. In other words, the second prismatic glass 22 is located between the first prismatic glass 21 and the diffuser 23. The diffuser 23 is laminated on the light guide plate 3. The diffuser 23 is employed to diffuse the incident light for preventing the interference phenomenon.

Figure 3:
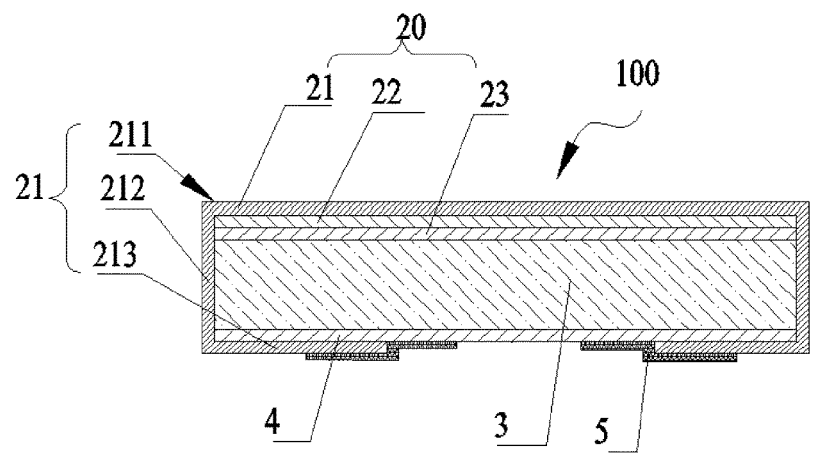
FIG. 3 is a structural diagram of a backlight module according to the second preferred embodiment of the present invention.

In the first embodiment of the present invention, as shown in FIG. 1, the two side walls extend to the middle to form two junction regions 213. The two junction regions 213 respectively form an integrated structure with one side wall. One of the junction regions is connected to one of the side walls, and the other of the junction regions is connected to the other of the side walls. The two junction regions respectively extend from the two side walls to each other, and the two junction regions 213 are adhered at a bottom of the reflective sheet 4 to form an accommodation space. In this embodiment, free ends of the two junction regions 213 can be connected together with the single-side tape 5. In the second embodiment of the present invention, as shown in FIG. 3, the two junction regions 213 can have no connection with each other, either. The two junction regions are respectively adhered at the bottom of the reflective sheet 4 with the single-side tape 5. A portion of the single-side tape 5 is adhered on the bottom of the reflective sheet 4, and the other portion is adhered on the reflective region 213.

Obviously, the two junction regions 213 also can be connected at a bottom of the reflective sheet 4 with a double-side tape or thermosetting adhesive.

Figure 4:
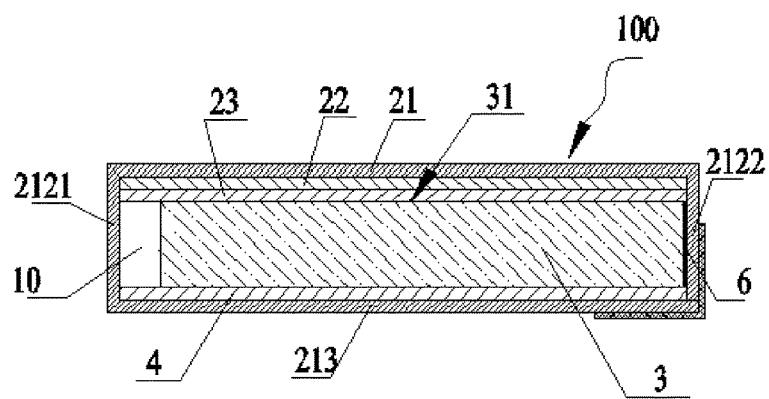
FIG. 4 is a structural diagram of a backlight module according to the third preferred embodiment of the present invention.

Please refer to FIG. 4. In the third embodiment of the present invention, the junction region 213 is formed by one side wall 2121 extending to the other side wall 2122. The junction region 213 and the side wall 2121 are an integrated structure. The junction region 213 and the side wall 2122 are adhered together with the single-side tape 5. In other words, a portion of the single-side tape is adhered on the side wall 2122, and the other portion is adhered on the reflective region 213 to form an accommodation space.

It is understandable that as shown in FIG. 4, in other embodiments of the present invention, the backlight module 100 can further comprise a light source 10. The light source 10 can be located at one circumferential outer surface of the light guide plate 3 to provide the backlight. The light emitted by the light source enters the light guide plate 3. Preferably, the light source can utilize the direct current power supply and has properties of longer usage lifetime and high brightness. In this embodiment, the light source can be a CCFL (Cold Cathode Fluorescent Lamp), a Hot Cathode Fluorescent Lamp, a LED (Light Emitting Diode) and an EL (Electroluminescence). In the specific transmission path of the light of the backlight module, after the light emitted from the light source 10 enters the light guide plate 3, a portion of the light directly reaches the illuminating surface 31 of the light guide plate 3. The other portion of the incident light is reflected by the reflective sheet 4, and reaches the illuminating surface 31 of the light guide plate 3. The reflected light exiting from the illuminating surface 31 sequentially reaches the diffuser 23, the second prismatic glass 22 and the first prismatic glass 21, and ultimately is incident into the display panel.

Preferably, the reflective sheet 4 is a reflective sheet having high reflectivity, and employed to raise the face brightness of the backlight module 100 in a certain light source output. It is understandable that for preferably reducing the light leakage as shown in FIG. 4, the circumferential outer surface of the light guide plate 3 where the light source is not located can be coated with a reflective coating layer 6 to prevent that the light leaks from the edge region of the light guide plate 3 and to promote the display result. For providing the backlight in the embodiment of the present invention, the reflective sheet 4 is a white reflective sheet or a silver reflective sheet, of which a reflective layer is coated on a surface thereof. The material of the reflective layer can utilize the reflective material of which the reflectivity is above 50% to promote the reflective result.

Furthermore, the light guide plate 3 utilizes Polymethylmethacrylate (PMMA)/Polycarbonate (PC) to convert the line light source into the area light source.

Preferably, an inner side of the side wall of the first prismatic glass 21 is coated with a reflective layer (not shown), and the reflective layer reflects light entering a surface thereof back into the light guide plate to promote the display result in advance.

Preferably, there should be seamless contacts between the light guide plate 3 and the reflective sheet 4, and between the light guide plate 3 and the optical film assembly 20. It cannot only reduce the entire thickness of the backlight module 100 but also promote the display quality.

It is understandable that the liquid crystal display and the backlight module 100 can be applied in any products or components having display function, such as the electronic paper, the TV, the mobile phone, the digital picture frame, the flat panel computer.

Above are embodiments of the present invention, which does not limit the scope of the present invention. Any modifications, equivalent replacements or improvements within the spirit and principles of the embodiment described above should be covered by the protected scope of the invention.

What is claimed is:

1. A backlight module, comprising an optical film assembly, a light guide plate, a reflective sheet, and the optical film assembly comprises a first prismatic glass, and the first prismatic glass comprises a display region, two side walls, a junction region, and the display region and the reflective sheet are oppositely located, and the side wall is formed by the display region extending downward, and the side wall is connected between the display region and the junction region to form an accommodation space, and the light guide plate and the reflective sheet stack up together inside the accommodation space, and the light guide plate is located between the reflective sheet and the optical film assembly, and the reflective sheet is located between the light guide plate and the junction region, wherein the junction region and one of the side walls are an integrated structure and extends to the other side wall and a free end of the junction region and a free end of the other side wall are connected together in contact with each other at a juncture of the junction region and the other side wall and are adhered together with a single-side tape, wherein a portion of the single-side tape is adhered on the other side wall, and the other portion of the single-side tape is adhered on the junction region to cross the juncture of the junction region and the other side wall.

2. The backlight module according to claim 1, wherein an inner side of the side wall of the first prismatic glass is coated with a reflective layer, and the reflective layer reflects light entering a surface thereof back into the light guide plate.

3. The backlight module according to claim 1, wherein the optical film assembly further comprises a second prismatic glass and a diffuser, and the second prismatic glass is located between the first prismatic glass and the diffuser, and the diffuser is laminated on the light guide plate.

4. The backlight module according to claim 1, wherein one circumferential outer surface of the light guide plate is provided with an incident surface, and the rest circumferential outer surfaces of the light guide plate are coated with a reflective layer, and the reflective layer reflects light entering a surface thereof back into the light guide plate.

5. A liquid crystal display, comprising a backlight module, and the backlight module comprises an optical film assembly, a light guide plate, a reflective sheet, and the optical film assembly comprises a first prismatic glass, and the first prismatic glass comprises a display region, two side walls, a junction region, and the display region and the reflective sheet are oppositely located, and the side wall is formed by the display region extending downward, and the side wall is connected between the display region and the junction region to form an accommodation space, and the light guide plate and the reflective sheet stack up together inside the accommodation space, and the light guide plate is located between the reflective sheet and the optical film assembly, and the reflective sheet is located between the light guide plate and the junction region, wherein the junction region and one of the side walls are an integrated structure and extends to the other side wall and a free end of the junction region and a free end of the other side wall are connected together in contact with each other at a juncture of the junction region and the other side wall and are adhered together with a single-side tape, wherein a portion of the single-side tape is adhered on the other side wall, and the other portion of the single-side tape is adhered on the junction region to cross the juncture of the junction region and the other side wall.

6. The liquid crystal display according to claim 5, wherein an inner side of the side wall of the first prismatic glass is coated with a reflective layer, and the reflective layer reflects light entering a surface thereof back into the light guide plate.

7. The liquid crystal display according to claim 5, wherein the optical film assembly further comprises a second prismatic glass and a diffuser, and the second prismatic glass is located between the first prismatic glass and the diffuser, and the diffuser is laminated on the light guide plate.

8. The liquid crystal display according to claim 5, wherein one circumferential outer surface of the light guide plate is provided with an incident surface, and the rest circumferential outer surfaces of the light guide plate are coated with a reflective layer, and the reflective layer reflects light entering a surface thereof back into the light guide plate.

* * * * *